(12) United States Patent
Dinesen

(10) Patent No.: US 9,989,759 B2
(45) Date of Patent: Jun. 5, 2018

(54) CAMERA LENS AND FIELD-DEPTH CALIBRATION METHOD THEREFOR

(71) Applicant: Palle Geltzer Dinesen, Shenzhen (CN)

(72) Inventor: Palle Geltzer Dinesen, Shenzhen (CN)

(73) Assignee: AAC TECHNOLOGIES PTE. LTD., Singapore (SG)

( * ) Notice: Subject to any disclaimer, the term of this patent is extended or adjusted under 35 U.S.C. 154(b) by 104 days.

(21) Appl. No.: 15/353,879

(22) Filed: Nov. 17, 2016

(65) Prior Publication Data

US 2017/0168293 A1 Jun. 15, 2017

(30) Foreign Application Priority Data

Dec. 15, 2015 (CN) .......................... 2015 1 0932685
Jul. 21, 2016 (JP) .................................. 2016-143742

(51) Int. Cl.
  *G02B 7/02* (2006.01)
  *G02B 27/00* (2006.01)
  *G02B 13/00* (2006.01)
(52) U.S. Cl.
  CPC .......... *G02B 27/0075* (2013.01); *G02B 7/028* (2013.01); *G02B 13/001* (2013.01)
(58) Field of Classification Search
  CPC ............ H04N 13/0207; G02B 27/0075; G02B 7/028; G02B 13/001

USPC .................................................. 359/811, 820
See application file for complete search history.

(56) References Cited

U.S. PATENT DOCUMENTS

2010/0025789 A1\* 2/2010 Imai .................. H01L 27/14618
                                                          257/432
2012/0200946 A1\* 8/2012 Wippermann ......... G02B 7/028
                                                          359/811

FOREIGN PATENT DOCUMENTS

GB            2488423 A * 8/2012 ............. H05B 1/023

\* cited by examiner

*Primary Examiner* — James Greece
(74) *Attorney, Agent, or Firm* — Na Xu; IPro, PLLC

(57) ABSTRACT

The present disclosure discloses a camera lens and a calibration method of field-depth for the camera lens. The camera lens includes a lens module, a central processing unit and a thermal expansion compensation module. The lens module includes a first lens and a second lens with a baseline length b2 to the first lens. The first lens includes a first lens unit formed on same glass substrate and a second lens unit with a baseline length b1 to the first lens unit. The baseline length change value between the second lens and the first lens can be calculated. Therefore the thermal expansion of the camera lens can be calibrated.

7 Claims, 2 Drawing Sheets

CAMERA LENS AND FIELD-DEPTH CALIBRATION METHOD THEREFOR

FIELD OF THE INVENTION

The present invention relates to a camera lens used in a portable electronic device, and a field-depth calibration method for such a camera lens.

DESCRIPTION OF RELATED ART

With progressive development of technology, electronic devices are developed constantly toward intelligent types. In addition to digital camera, portable electronic devices such as iPad, mobile phones and so on are also equipped with camera module. In order to meet the requirements of people, the camera module also puts higher request on the object image quality. Not only that, along with development of 3D imaging technology, mobile devices are equipped with naked eye 3D camera lens, that has become a development trend.

3D lens module of related technologies adopts two lenses module to simulate the imaging function of human eyes to take a picture with a certain field depth. As shown in FIG. 1, a 3D lens module of related technologies includes an image sensor and a first lens C1 and a second lens C2 which are connected electrically to the image sensor. Both the first lens and the second lens have focal length f. The baseline length between the first lens and the second lens is b. The image sensor has parallax d. The field-depth of this 3D lens module is $Z=f\times b/d$.

The first lens C1 and the second lens C2 are usually made of resin. When mobile phone and other portable electronic devices are working, the internal temperature will rise. Under the influence of temperature, the baseline length between the first lens C1 and the second lens C2 is changed to $b+\Delta b$. The field depth Z is changed thereby. The field depth is $Z'=f\times(b+\Delta b)/d$ then. As a result, the field-depth shall be calibrated. But the field depth calibration is difficult as the temperature inside the parts of portable electronic devices such as mobile phones is not equal. For example, the temperature in the circuit board, chips, image sensor of mobile phone is not same, so it is not practical to calculate the baseline length change of the first lens C1 and the second lens C2 by measuring the internal temperature of mobile phone. Because the baseline length variation $\Delta b$ between the first lens C1 and the second lens C2 cannot be calculated, the field depth cannot be calibrated.

For this reason, it is necessary to provide a new type of camera lens and a field depth calibration method to overcome the disadvantages mentioned above.

BRIEF DESCRIPTION OF THE DRAWINGS

Many aspects of the embodiment can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION OF THE EXEMPLARY EMBODIMENT

The present invention will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

Figure 1:
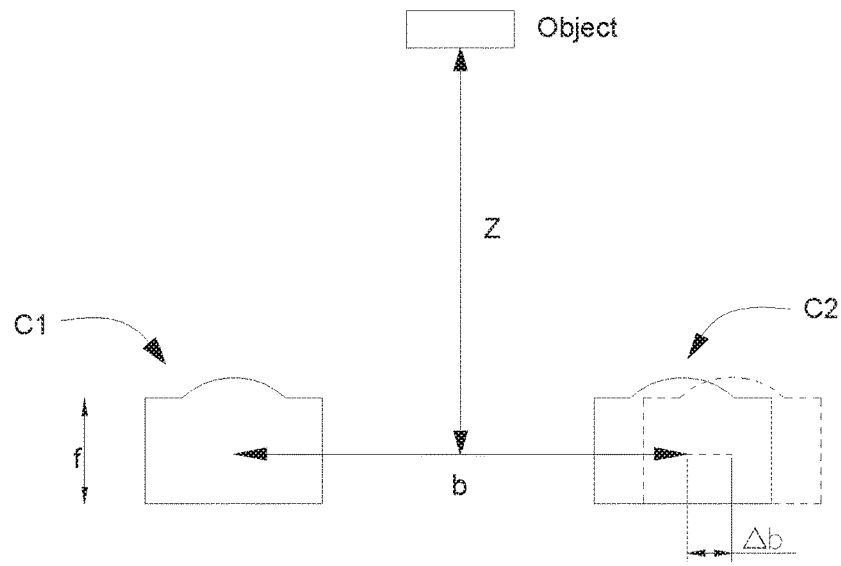
FIG. 1 is a structural diagram of a 3D lens module of related technology.
Figure 2:
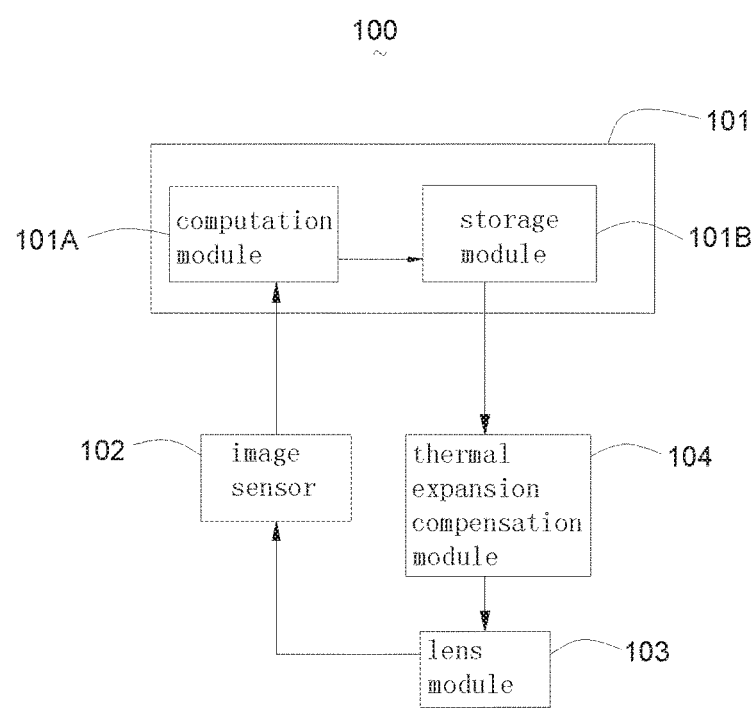
FIG. 2 is a structural block diagram of a camera lens in accordance with an exemplary embodiment of the present disclosure.

As shown in FIG. 2, a camera lens 100, in accordance with an exemplary embodiment of the present disclosure, includes a central processing unit (CPU) 101, an image sensor 102 which is connected electrically with the central processing unit 101, a lens module 103 which is connected electrically with the image sensor 102, and a thermal compensation module 104 which is connected electrically with the central processing unit 101. The central processing unit 101 includes a computation module 101A and a memory module 101B. The lens module 103 includes a first lens 105 and a second lens 106.

Figure 3:
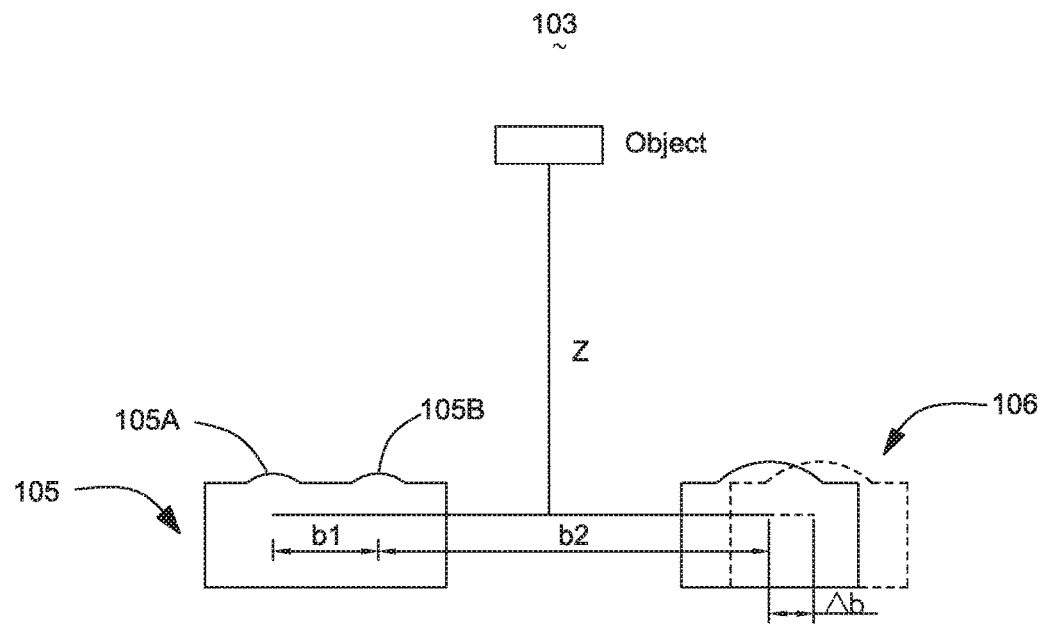
FIG. 3 is a structural diagram of a lens module in the camera lens in FIG. 1.

As shown in FIG. 3, the first lens 105 has a focal length f1, a glass substrate, a first lens unit 105A and a second lens unit 105B formed on the glass substrate. That is to say, the first lens 105 is a 1×2 integral glass lens. The baseline length between the first lens unit 105A and the second lens unit 105B is b1. Because the first lens unit 105A and the second lens unit 105B are formed on the same glass substrate, and the thermal expansion coefficient of the glass substrate is very small, the change of the baseline length b1 between the first lens unit 105A and the second lens unit 105B affected by temperature is almost negligible, as a constant value. The field depth can be calculated with the constant value b1 from expression $Z=f1\times b1/d$, where d is the parallax coefficient of the image sensor.

The second lens 106 has a focal length f2. The baseline length between the second lens 106 and the first lens 105 is b2. Here, b2 can be the baseline length between the second lens 106 and the first lens unit 105A, or the baseline length between the second lens 106 and the second lens unit 105B. Under the influence of working temperature of the camera lens 100, b2 is a changing value. Suppose, after the working temperature of b2 rises to t° C., b2 is changed by $\Delta b$. The position of the second lens 106 is changed from the solid line to the dotted line as shown in the FIG. 3. At this time, $b2'=b2+\Delta b$. At this time, $Z'=f2\times(b2+\Delta b)/d$.

If the field-depth is calibrated, make $Z=Z'$. That is to say, take constant Z as a benchmark, namely $f1\times b1/d=f2\times(b2+\Delta b)/d$. The computation module 101A of the central processing unit 101 can get by calculation the value of $\Delta b$ according to expression $\Delta b=(f2\times b2-f1\times b1)/f2$. Then the value of $\Delta b$ is stored in the storage module 101B of the central processing unit 101.

The thermal expansion compensation module 104 calls the value of $\Delta b$ from the memory module 101B to move the second lens 106 toward the direction opposite to the thermal expansion direction, namely, to drive the second lens 106 back to the initial position, thereby the field-depth calibration of the camera lens 100 is complete. The thermal expansion compensation module 104 of the present invention can be a driver module, which moves the second lens 106 by a distance of Δb in the direction opposite to the direction of thermal expansion, thereby the field-depth calibration of the camera lens is complete. Certainly, the thermal expansion compensation module 104 can also be any other structure which can move the second lens 106.

Figure 4:
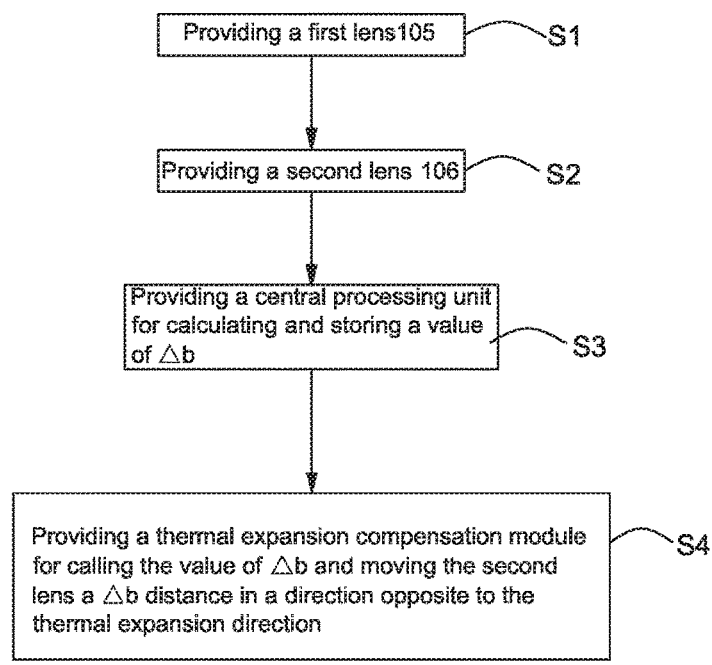
FIG. 4 is a flow chart of a field-depth calibration method for the camera lens in FIG. 1.

As shown in FIG. 4, the present disclosure also discloses a field-depth calibration method for the camera lens 100. It includes following steps:

S1. Providing a first lens 105 which has a focal length f1, includes a first lens unit 105A and a second lens unit 105B formed on the glass substrate. The baseline length between the first lens unit 105A and the second lens unit 105B is b1.

S2. Providing a second lens 106 which has a focal length f2. The baseline length between the second lens 106 and the first lens 105 is b2.

S3. Providing a central processing unit 101 which calculates and stores the value of Δb according to the condition expression Δb=(f2×b2−f1×b1)/b2.

S4. Providing a thermal expansion compensation module 104 which calls the value of Δb and moves the second lens 106 by Δb distance in the direction opposite to the thermal expansion direction.

The present disclosure, by introducing 1×2 integral glass lens and a common lens, takes the advantage of the characteristics of low thermal expansion coefficient of glass lens and gets by calculation the baseline length change value between the first lens and the second lens caused by the temperature change according to the field-depth calculated on the integral glass lens. The field-depth calibration of the camera lens becomes possible.

It is to be understood, however, that even though numerous characteristics and advantages of the present exemplary embodiment have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A camera lens, comprising:
a lens module including a first lens having a focal length f1, a glass substrate, a first lens unit and a second lens unit both formed on the glass substrate, a second lens having a focal length f2, a baseline length between the first lens unit and the second lens unit being defined as b1, and a baseline length between the second lens and the first lens being defined as b2;
an image sensor connected electrically with the lens module;
wherein
the lens module satisfies the following condition:

Δb=(f2×b2−f1×b1)/b2; where b1 is a constant value;
Δb is the variation of the baseline length between the first lens and the second lens when the working temperature of the camera lens rises; and wherein
the lens module further comprises a central processing unit for calculating and storing the value of Δb, and a thermal expansion compensation module connected electrically with the central processing unit for compensating the thermal expansion of b2 based on the value of Δb.

2. The camera lens as described in claim 1, wherein the thermal expansion compensation module is a driver module for moving the second lens a Δb distance at a direction opposite to the thermal expansion direction.

3. The camera lens as described in claim 1, wherein the central processing unit (CPU) includes a calculation module used for calculating Δb and a memory module used for storing Δb.

4. The camera lens as described in claim 1, wherein b2 is the baseline length between the second lens and the first lens unit, or the baseline length between the second lens and the second lens unit.

5. A field-depth calibration method for the camera lens as described in claim 1, wherein the method includes following steps:

S1: Providing a first lens having a focal length f1, and including a first lens unit and a second lens unit both formed on a glass substrate, a baseline length between the first lens unit and the second lens unit being defined as b1;

S2: Providing a second lens having a focal length f2, a baseline length between the second lens and the first lens being defined as b2;

S3: Providing a central processing unit for calculating and storing a value of Δb according to the condition Δb=(f2×b2−f1×b1)/b2;

S4: Providing a thermal expansion compensation module for calling the value of Δb and moving the second lens a Δb distance in a direction opposite to the thermal expansion direction.

6. The field-depth calibration method as described in claim 5, wherein the central processing unit (CPU) includes a calculation module used for calculating Δb and a memory module used for storing Δb.

7. The field-depth calibration method as described in claim 5, wherein the thermal expansion compensation module is a driver module that moves the second lens by the Δb length in the direction opposite to the thermal expansion direction.

* * * * *